US011691289B2

(12) United States Patent
Sinyavskiy et al.

(10) Patent No.: US 11,691,289 B2
(45) Date of Patent: Jul. 4, 2023

(54) SYSTEMS AND METHODS FOR ROBOTIC BEHAVIOR AROUND MOVING BODIES

(71) Applicant: Brain Corporation, San Diego, CA (US)

(72) Inventors: Oleg Sinyavskiy, San Diego, CA (US); Borja Ibarz Gabardos, La Jolla, CA (US); Jean-Baptiste Passot, Solana Beach, CA (US)

(73) Assignee: Brain Corporation, San Diego, CA (US)

( * ) Notice: Subject to any disclaimer, the term of this patent is extended or adjusted under 35 U.S.C. 154(b) by 217 days.

(21) Appl. No.: 16/030,690

(22) Filed: Jul. 9, 2018

(65) Prior Publication Data
US 2019/0047147 A1   Feb. 14, 2019

Related U.S. Application Data

(63) Continuation of application No. 15/199,224, filed on Jun. 30, 2016, now Pat. No. 10,016,896.

(51) Int. Cl.
*B25J 9/16* (2006.01)
*B25J 5/00* (2006.01)

(52) U.S. Cl.
CPC ............. *B25J 9/1676* (2013.01); *B25J 5/007* (2013.01); *B25J 9/1697* (2013.01);
(Continued)

(58) Field of Classification Search
CPC .... B25J 11/0005; B25J 11/001; B25J 9/1694; B25J 9/1676; B25J 5/007; B25J 9/1697;
(Continued)

(56) References Cited

U.S. PATENT DOCUMENTS

2011/0152726 A1*   6/2011   Cuddihy ............ G06K 9/00348
                                                                600/595
2012/0197439 A1*   8/2012   Wang .................... B25J 11/009
                                                                700/259
(Continued)

FOREIGN PATENT DOCUMENTS

EP          2209018 A1      7/2010
EP          2783797 A2     10/2014
JP       2004170166 A1 *    6/2004

OTHER PUBLICATIONS

English translation of JP2004170166A1 (Year: 2004).*
(Continued)

*Primary Examiner* — Rachid Bendidi
(74) *Attorney, Agent, or Firm* — Reed Smith LLP; Sidharth Kapoor

(57) ABSTRACT

Systems and methods for detection of people are disclosed. In some exemplary implementations, a robot can have a plurality of sensor units. Each sensor unit can be configured to generate sensor data indicative of a portion of a moving body at a plurality of times. Based on at least the sensor data, the robot can determine that the moving body is a person by at least detecting the motion of the moving body and determining that the moving body has characteristics of a person. The robot can then perform an action based at least in part on the determination that the moving body is a person.

13 Claims, 8 Drawing Sheets

(52) U.S. Cl.
CPC .............. *G05B 2219/40442* (2013.01); *G05B 2219/49143* (2013.01); *G05B 2219/49157* (2013.01); *Y10S 901/01* (2013.01)

(58) Field of Classification Search
CPC ..... B25J 9/161; B25J 19/021; G06F 17/2785; G06F 17/30654; G06N 3/008; G10L 15/1815; G10L 15/19; G10L 15/22; Y10S 901/47; Y10S 901/46; Y10S 901/01; G05B 2219/40442; G05B 2219/49143; G05B 2219/49157; G05B 2219/40202; G05B 19/4061; G05B 2219/49141; G05B 2219/39082; B60W 2554/00; B60W 2554/4029; B60W 30/09
See application file for complete search history.

(56) References Cited

U.S. PATENT DOCUMENTS

| | | | | |
|---|---|---|---|---|
| 2013/0251194 | A1* | 9/2013 | Schamp | G06T 7/11 382/103 |
| 2016/0007158 | A1* | 1/2016 | Venkatraman | H04W 4/023 455/456.2 |
| 2016/0188977 | A1* | 6/2016 | Kearns | G06K 9/00664 348/113 |
| 2018/0246518 | A1* | 8/2018 | Vogel | G05D 1/0225 |

OTHER PUBLICATIONS

Benedek "Lidar-Based Gait Analysis In People Tracking And 4d Visualization" EUSIPCO (Year: 2015).*
Taipalus et al. "Human Detection and Tracking With Knee-High Mobile 2D LIDAR" (Year: 2011).*
U.S. Appl. No. 15/199,224, filed Jun. 30, 2016.
Leykin et al., "Thermal-Visable Video Fusion for Moving Target Tracking and Pedestrian Classification", Computer Vision And Pattern Recognition, 2007. CVPR '07. IEEE Conference on, Jun. 1, 2007, pp. 1-8, XP055335449, DOI: 10.1109/CVPR.2007.383444 ISBN: 978-1-1244-1180-1.
Hafner et al., "Human-Humanoid walking gait recognition", Humanoid Robots, 2008, Humanoids 2008, 8th IEEE-RAS International Conference On, IEEE, Piscataway, NJ, USA, Dec. 1, 2008, pp. 598-602, XP031825371, ISBN: 978-1-4244-2821-2.
Extended European Search Report for EP Patent Application No. 17821370.8, dated Jan. 22, 2020.
Written Opinion for PCT/US2017/040324, dated Sep. 28, 2017.
International Search Report for PCT/US2017/040324, dated Sep. 28, 2017.

* cited by examiner

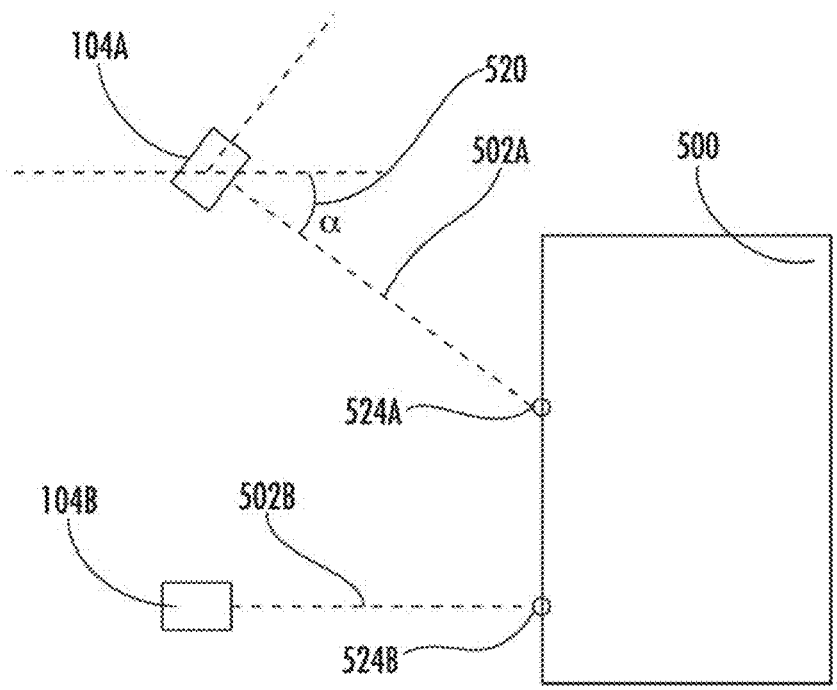
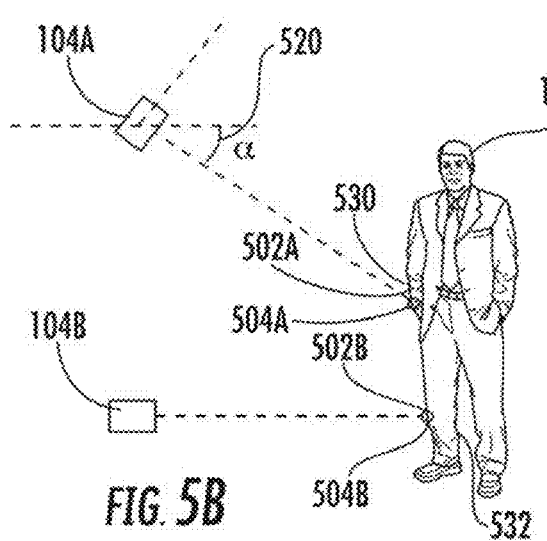
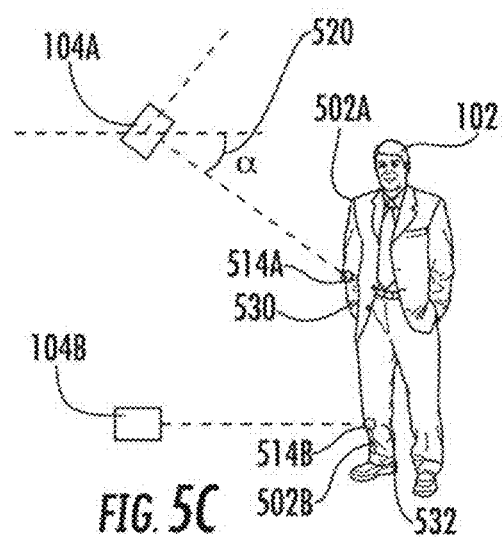

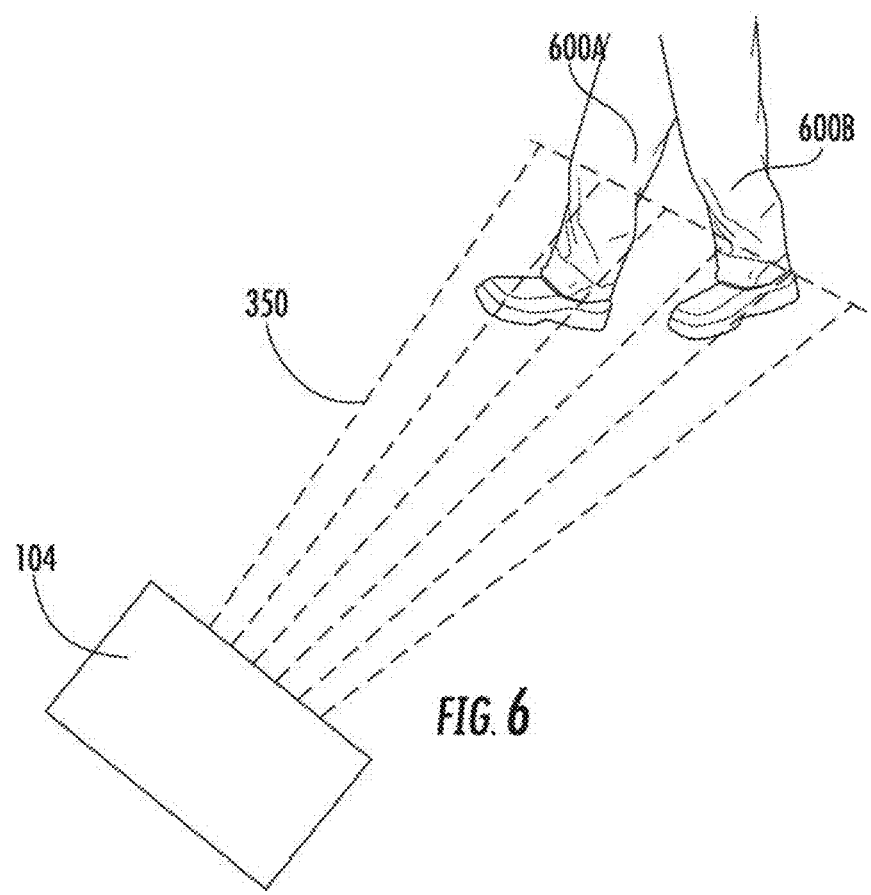

SYSTEMS AND METHODS FOR ROBOTIC BEHAVIOR AROUND MOVING BODIES

PRIORITY

This application is a continuation of, and claims the benefit of priority to, co-owned and co-pending U.S. patent application Ser. No. 15/199,224 of the same title filed Jun. 30, 2016, the contents of which being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present application relates generally to robotics, and more specifically to systems and methods for detecting people and/or objects.

Background

As robots begin to operate autonomously, one challenge is how those robots interact with moving bodies such as people, animals, and/or objects (e.g., non-human, non-animal objects). For example, robots can harm and/or scare people and/or animals if the robots do not slow down, move intentionally, and/or otherwise behave with certain characteristics that people and/or animals do not desire and/or expect. However, these same behaviors may be inefficient when interacting with non-humans and/or non-animals. For example, always slowing down when interacting with objects can cause a robot to navigate very slowly and/or otherwise be inefficient. Also, trying to navigate around moving bodies that are also moving may cause a robot to vary greatly from its path where merely stopping and waiting for the moving body to pass may be more effective and/or efficient.

Moreover, in many cases, people may feel more comfortable knowing that robots can recognize them. Accordingly, having robots behave differently around humans and/or animals than around objects can create the perception of safety and inspire confidence in the robot's autonomous operation.

Currently, many robots do not behave differently around moving bodies and do not behave differently in the presence of people and/or animals. Indeed, many robots are programmed with a set of behaviors that they perform in any setting. Even where robots are capable of recognizing people, the algorithms can be slow, expensive to implement, and/or otherwise ineffective in a dynamically changing environment where a robot is performing tasks. Accordingly, there is a need for improved systems and methods for detection of people, animals, and/or objects.

SUMMARY

The foregoing needs are satisfied by the present disclosure, which provides for, inter alia, apparatus and methods for operating a robot for autonomous navigation. Example implementations described herein have innovative features, no single one of which is indispensable or solely responsible for their desirable attributes. Without limiting the scope of the claims, some of the advantageous features will now be summarized.

In some implementations, a robot can have a plurality of sensor units. Each sensor unit can be configured to generate sensor data indicative of a portion of a moving body at a plurality of times. Based on at least the sensor data, the robot can determine that the moving body is a person by at least detecting the motion of the moving body and determining that the moving body has characteristics of a person. The robot can then perform an action based at least in part on the determination that the moving body is a person.

In a first aspect, a robot is disclosed. In one exemplary implementation, the robot includes a first sensor unit configured to generate first sensor data indicative of a first portion of a moving body over a first plurality of times; a second sensor unit configured to generate second sensor data indicative of a second portion of the moving body over a second plurality of times; and a processor. The processor is configured to: detect motion of the moving body based at least on the first sensor data at a first time of the first plurality of times and the first sensor data at a second time of the first plurality of times, determine that the moving body comprises a continuous form from at least the first sensor data and the second sensor data, detect at least one characteristic of the moving body that is indicative the moving body comprising a person from at least one of the first sensor data and the second sensor data, identify the moving body as a person based at least on the detected at least one characteristic and the determination that the moving body comprises the continuous form, and perform an action in response to the identification of the moving body as a person.

In one variant, the at least one characteristic of the moving body comprises a gait pattern for a person. In another variant, the gait pattern includes alternating swings of the legs of a person. In another variant, the at least one characteristic of the moving body comprises an arm swing of a person. In another variant, the characteristic of a person is based at least on the size and shape of the moving body.

In another variant, the detection of motion of the moving body is based at least in part on a difference signal determined from the first sensor data at the first time and the first sensor data at the second time.

In another variant, the action comprises a stop action for the robot, the stop action configured to allow the moving body to pass. In another variant, the robot further comprises a third sensor unit disposed on a rearward facing side of the robot, wherein the processor is further configured to determine that the moving body comprises a person based at least on the moving body being detected by the third sensor unit. In another variant, the first sensor unit comprises a light detection and ranging sensor.

In a second aspect, a non-transitory computer-readable storage medium is disclosed. In one exemplary implementation, the non-transitory computer-readable storage medium has a plurality of instructions stored thereon, the instructions being executable by a processing apparatus for detecting people. The instructions are configured to, when executed by the processing apparatus, cause the processing apparatus to: detect motion of a moving body based at least on a difference signal generated from sensor data; determine from the sensor data that the moving body has at least two points in substantially the same vertical plane; identify the moving body as a person based at least in part on: (i) the detection of at least one characteristic indicative of a person, and (ii) the determination that the moving body has the at least two points in substantially the same vertical plane; and execute an action in response to the identification of the moving body as a person.

In one variant, the at least one characteristic of a person is a gait pattern. In another variant, the gait pattern includes one stationary leg and one swinging leg of the person. In another variant, the action comprises a stop action, the executed stop action configured to allow the moving body to pass.

In another variant, the instructions are configured to further cause the processing apparatus to: detect at least one characteristic of the moving body that is indicative of an animal from the sensor data; identify the moving body as an animal based at least on the detected at least one characteristic of the moving body that is indicative of an animal; and perform an action in response to the moving body being the animal.

In another variant, the sensor data is generated from a plurality of sensor units.

In a third aspect, a method for detecting a moving body, such a person, animal, and/or object, is disclosed. In one exemplary implementation, the method includes: detecting motion of a moving body based at least on a difference signal generated from sensor data; identifying the moving body is a person based at least on detecting at least a gait pattern of the moving body; and performing an action in response to the identification of the moving body being as a person.

In one variant, wherein the detected gait pattern comprises detecting alternating swings of the legs of a person. In another variant, the performed action includes stopping the robot in order to allow the moving body to pass.

In another variant determining that the moving body has a substantially column-like shape from the sensor data. In another variant, generating sensor data from a plurality of sensor units. In another variant, wherein the detection of motion comprises determining if the difference signal is greater than a difference threshold. In another variant, the detected gait pattern comprises detecting one stationary leg and detecting one swinging leg of a person.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements throughout.

FIG. 5A is a functional block diagram illustrating an elevated side view of exemplary sensor units detecting a moving body in accordance with some implementations of the present disclosure.

FIGS. 5B-5C are functional block diagrams of the sensor units illustrated in FIG. 5A detecting a person in accordance with some principles of the present disclosure.

FIG. 6 is an angled top view of an exemplary sensor unit detecting the swinging motion of legs in accordance with some implementations of the present disclosure.

DETAILED DESCRIPTION

Figure 1:
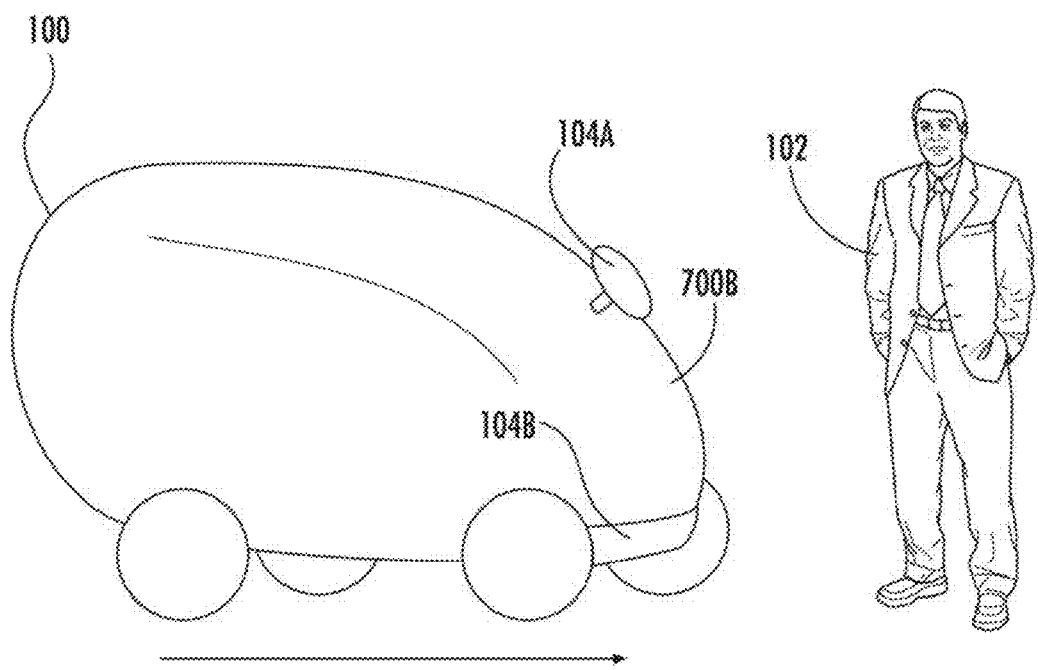
FIG. 1 is an elevated side view of an exemplary robot interacting with a person in accordance with some implementations of the present disclosure.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of, or combined with, any other aspect of the disclosure. For example, an apparatus can be implemented or a method can be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein can be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for improved systems and methods for detection of people, animals, and/or objects. As used herein, a robot can include mechanical or virtual entities configured to carry out complex series of actions automatically. In some cases, robots can be electro-mechanical machines that are guided by computer programs or electronic circuitry. In some cases, robots can include electro-mechanical components that are configured for navigation, where the robot can move from one location to another. Such navigating robots can include autonomous cars, floor cleaners, rovers, drones, and the like. In some cases, robots can be stationary, such as robotic arms, lifts, cranes, etc. As referred to herein, floor cleaners can include floor cleaners that are manually controlled (e.g., driven or remote control) and/or autonomous (e.g., using little to no user control). For example, floor cleaners can include floor scrubbers that a janitor, custodian, or other person operates and/or robotic floor scrubbers that autonomously navigate and/or clean an environment. In some implementations, some of the systems and methods described in this disclosure can be implemented in a virtual environment, where a virtual robot can detect people, animals, and/or objects in a simulated environment (e.g., in a computer simulation) with characteristics of the physical world. In some cases, the robot can be trained to detect people, animals, and/or objects in the virtual environment and apply that learning to detect spills in the real world.

Some examples in this disclosure may describe people, and include references to anatomical features of people such as legs, upper-bodies, torso, arms, hands, etc. A person having ordinary skill in the art would appreciate that animals can have similar anatomical features and many of the same systems and methods described in this disclosure with reference to people can be readily applied to animals as well. Accordingly, in many cases throughout this disclosure, applications describing people can also be understood to apply to animals.

Some examples in this disclosure may refer to moving bodies and static bodies. Moving bodies can include dynamic bodies such as people, animals, and/or objects (e.g., non-human, non-animal objects), such as those in motion. Static bodies include stationary bodies, such as stationary objects and/or objects with substantially no movement. In some cases, normally dynamic bodies, such as people, animals, and/or objects (e.g., non-human, non-animal objects) may also be static for at least a period of time in that they can exhibit little to no movement.

Detailed descriptions of the various implementations and variants of the system and methods of the disclosure are now provided. While some examples will reference navigation, it should be understood that robots can perform other actions besides navigation, and this application is not limited to just navigation. Myriad other example implementations or uses for the technology described herein would be readily envisaged by those having ordinary skill in the art, given the contents of the present disclosure.

Advantageously, the systems and methods of this disclosure at least: (i) provide for automatic detection of people, animals, and/or objects; (ii) enable robotic detection of people, animals, and/or objects; (iii) reduce or eliminate injuries by enabling safer interactions with moving bodies; (iv) inspire confidence in the autonomous operation of robots; (v) enable quick and efficient detection of people, animals, and/or objects; and (vi) enable robots to operate in dynamic environments where people, animals, and/or object may be present. Other advantages are readily discernable by one of ordinary skill given the contents of the present disclosure.

For example, people and/or animals can behave unpredictably and/or suddenly. By way of illustration a person and/or animal can change directions abruptly. A person and/or animal can also change speeds quickly, in some cases with little notice. Present systems that do not differentiate between people/animals and objects may not adequately react to the behaviors of people/animals. Accordingly, it is desirable that an autonomously operating robot be able to recognize persons and/or animals and perform actions accordingly.

As another example, people and/or animals can be wary of robots. For example, people and/or animals may be afraid that robots will behave in harmful ways, such as by running into them or mistakenly performing actions on them as if they were objects. This fear can create tension between interactions between robots and humans and/or animals and prevent robots from being deployed in certain scenarios. Accordingly, there is a need to improve the recognition by robots of human, animals, and/or objects, and to improve the behavior of robots based at least on that recognition.

As another example, current systems and methods for recognizing people and/or animals by robots can often rely on high resolution imaging and/or resource-heavy machine learning. In some cases, such a reliance can be expensive (e.g., in terms of monetary costs and/or system resources) to implement. Accordingly, there is a need to improve the systems and methods for detecting people, animals, and/or objects in efficient and/or effective ways.

As another example, moving bodies can cause disruptions to the navigation of routes by robots. For example, many current robots may try to swerve around objects that the robot encounters. However, in some cases, when the robots try to swerve around moving bodies, the moving bodies may be also going in the direction that the robots try to swerve, causing the course of the robots to be further thrown off course. In some cases, it would be more effective and/or efficient for the robot to stop and wait for moving bodies to pass rather than swerve around them. Accordingly, there is a need in the art for improved actions of robots in response to the presence of moving bodies.

FIG. 1 is an elevated side view of robot 100 interacting with person 102 in accordance with some implementations of this disclosure. The appearance of person 102 is for illustrative purposes only. Person 102 should be understood to represent any person regardless of height, gender, size, race, nationality, age, body shape, or other characteristics of a human other than characteristics explicitly discussed herein. Also, person 102 may not be a person at all. Instead, person 102 can be representative of an animal and/or other living creature that may interact with robot 100. Person 102 may also not be living, but rather have the appearance of a person and/or animal. For example, person 102 can be a robot, such as a robot designed to appear and/or behave like a human and/or animal.

In some implementations, robot 100 can operate autonomously with little to no contemporaneous user control. However, in some implementations, robot 100 may be driven by a human and/or remote-controlled. Robot 100 can have a plurality of sensor units, such as sensor unit 104A and sensor unit 104B, which will be described in more detail with reference to FIG. 3A and FIG. 3B. Sensor unit 104A and sensor unit 104B can be used to detect the surroundings of robot 100, including any objects, people, animals, and/or anything else in the surrounding. A challenge that can occur in present technology is that present sensor unit systems, and methods using them, may detect the presence of objects, people, animals, and/or anything else in the surrounding, but may not differentiate between them. As described herein, sensor unit 104A and sensor unit 104B can be used to differentiate the presence of people/animals from other objects. In some implementations, sensor unit 104A and sensor unit 104B can be positioned such that their fields of view extend from front side 700B of robot 100.

Figure 2:
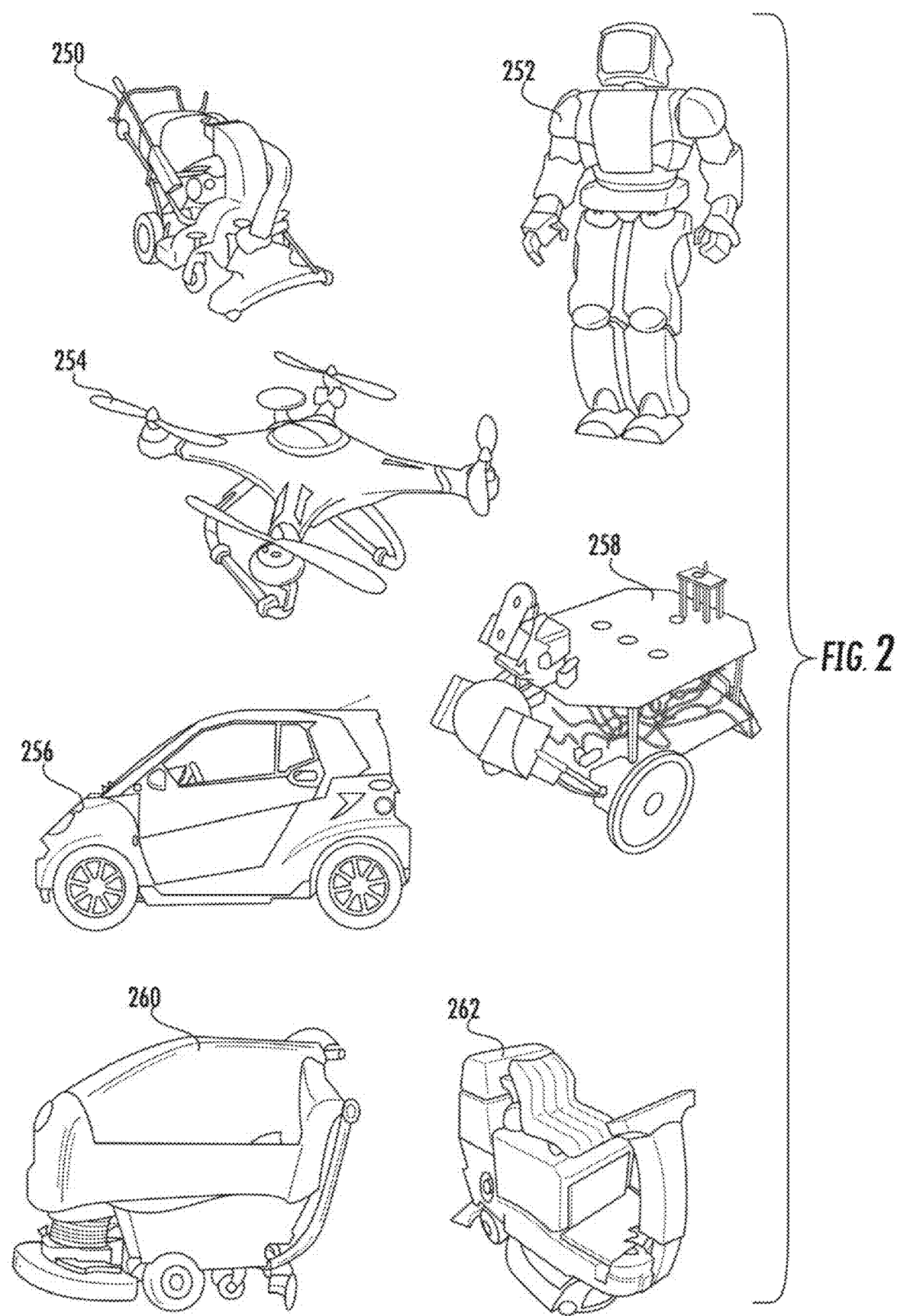
FIG. 2 illustrates various side elevation views of exemplary body forms for a robot in accordance with principles of the present disclosure.

A person having ordinary skill in the art would appreciate that robot 100 can have any number of different appearances/forms, and illustrations in this disclosure are not meant to limit robot 100 to any particular body form. FIG. 2 illustrates various side elevation views of exemplary body forms for robot 100 in accordance with principles of the present disclosure. These are non-limiting examples meant to further illustrate the variety of body forms, but not to restrict robot 100 to any particular body form. For example, body form 250 illustrates an example where robot 100 is a stand-up shop vacuum. Body form 252 illustrates an example where robot 100 is a humanoid robot having an appearance substantially similar to a human body. Body form 254 illustrates an example where robot 100 is a drone having propellers. Body form 256 illustrates an example where robot 100 has a vehicle shape having wheels and a passenger cabin. Body form 258 illustrates an example where robot 100 is a rover.

Body form 260 can be a motorized floor scrubber enabling it to move with little to no user exertion upon body form 260 besides steering. The user may steer body form 260 as it moves. Body form 262 can be a motorized floor scrubber having a seat, pedals, and a steering wheel, where a user can drive body form 262 like a vehicle as body form 262 cleans.

Figure 3A:
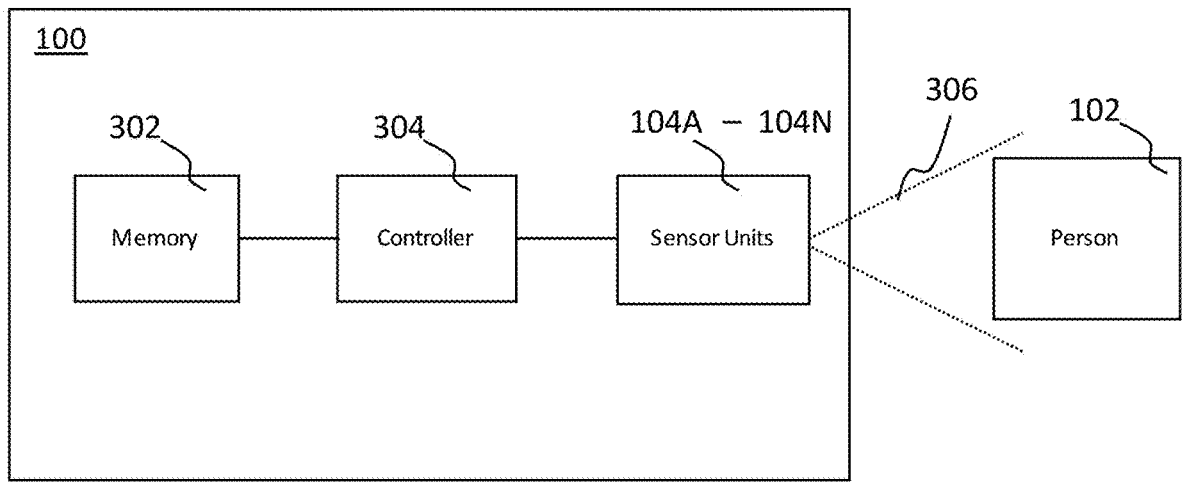
FIG. 3A is a functional block diagram of one exemplary robot in accordance with some implementations of the present disclosure.

FIG. 3A is a functional block diagram of one exemplary robot 100 in accordance with some implementations of the present disclosure. As illustrated in FIG. 3A, robot 100 includes controller 304, memory 302, and sensor units 104A-104N, each of which can be operatively and/or communicatively coupled to each other and each other's components and/or subcomponents. As used herein, the "N" in sensor units 104A-104N indicates at least in part that there can be any number of sensor units, and this disclosure is not limited to any particular number of sensor units, nor does this disclosure require any number of sensor units. Controller 304 controls the various operations performed by robot 100. Although a specific implementation is illustrated in FIG. 3A, it is appreciated that the architecture may be varied in certain implementations as would be readily apparent to one of ordinary skill in the art given the contents of the present disclosure.

Controller 304 can include one or more processors (e.g., microprocessors) and other peripherals. As used herein, the terms processor, microprocessor, and digital processor can include any type of digital processing devices such as, without limitation, digital signal processors ("DSPs"), reduced instruction set computers ("RISC"), general-purpose ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die, or distributed across multiple components.

Controller 304 can be operatively and/or communicatively coupled to memory 302. Memory 302 can include any type of integrated circuit or other storage device adapted for storing digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output RAM ("EDO"), fast page mode RAM ("FPM"), reduced latency DRAM ("RLDRAM"), static RAM ("SRAM"), flash memory (e.g., NAND/NOR), memristor memory, pseudostatic RAM ("PSRAM"), etc. Memory 302 can provide instructions and data to controller 304. For example, memory 302 can be a non-transitory, computer-readable storage medium having a plurality of instructions stored thereon, the instructions being executable by a processing apparatus (e.g., controller 304) to operate robot 100. In some cases, the instructions can be configured to, when executed by the processing apparatus, cause the processing apparatus to perform the various methods, features, and/or functionality described in this disclosure. Accordingly, controller 304 can perform logical and arithmetic operations based on program instructions stored within memory 302.

Throughout this disclosure, reference may be made to various controllers and/or processors. In some implementations, a single controller (e.g., controller 304) can serve as the various controllers and/or processors described. In other implementations, different controllers and/or processors can be used, such as controllers and/or processors used particularly for one or more of sensor units 104A-104N. Controller 304 can send and/or receive signals, such as power signals, control signals, sensor signals, interrogatory signals, status signals, data signals, electrical signals and/or any other desirable signals, including discrete and analog signals to sensor units 104A-104N. Controller 304 can coordinate and/or manage sensor units 104A-104N and other components/subcomponents, and/or set timings (e.g., synchronously or asynchronously), turn on/off, control power budgets, receive/send network instructions and/or updates, update firmware, send interrogatory signals, receive and/or send statuses, and/or perform any operations for running features of robot 100.

In some implementations, one or more of sensor units 104A-104N can comprise systems that can detect characteristics within and/or around robot 100. One or more of sensor units 104A-104N can include sensors that are internal to robot 100 or external, and/or have components that are partially internal and/or partially external. One or more of sensor units 104A-104N can include sensors such as sonar, Light Detection and Ranging ("LIDAR") (e.g., 2D or 3D LIDAR), radar, lasers, video cameras, infrared cameras, 3D sensors, 3D cameras, and/or any other sensor known in the art. In some implementations, one or more sensor units 104A-104N can include a motion detector, including a motion detector using one or more of Passive Infrared ("PIR"), microwave, ultrasonic waves, tomographic motion detector, or video camera software. In some implementations, one or more of sensor units 104A-104N can collect raw measurements (e.g., currents, voltages, resistances gate logic, etc.) and/or transformed measurements (e.g., distances, angles, detected points in people/animals/objects, etc.). In some implementations, one or more of sensor units 104A-104N can have one or more field of view 306 from robot 100, where field of view 306 can be the detectable area of sensor units 104A-104N. In some cases, field of view 306 is a three-dimensional area in which the one or more sensors of sensor units 104A-104N can send and/or receive data to sense at least some information regarding the environment within field of view 306. Field of view 306 can also be in a plurality of directions from robot 100 in accordance with how sensor units 104A-104N are positioned. In some implementations, person 102 may be, at least in part, within field of view 306.

Figure 3B:
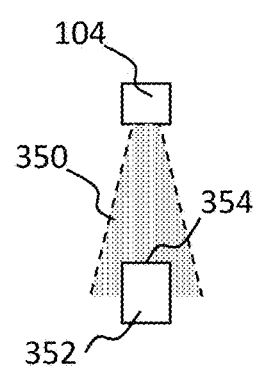
FIG. 3B illustrates an exemplary sensor unit that includes a planar LIDAR in accordance with some implementations of the present disclosure.

FIG. 3B illustrates an example sensor unit 104 that includes a planar LIDAR in accordance with some implementations of this disclosure. Sensor unit 104 as used throughout this disclosure represents any one of sensor units 104A-104N. The LIDAR can use light (e.g., ultraviolet, visible, near infrared light, etc.) to image items (e.g., people, animals, objects, bodies, etc.) in field of view 350 of the LIDAR. Within field of view 350, the LIDAR can detect items and determine their locations. The LIDAR can emit light, such as by sending pulses of light (e.g., in micropulses or high energy systems) with wavelengths including 532 nm, 600-1000 nm, 1064 nm, 1550 nm, or other wavelengths of light. The LIDAR can utilize coherent or incoherent detection schemes. A photodetector and/or receiving electronics of the LIDAR can read and/or record light signals, such as, without limitation, reflected light that was emitted from the LIDAR and/or other reflected and/or emitted light. In this way, sensor unit 104, and the LIDAR within, can create a point cloud of data, wherein each point of the point cloud is indicative at least in part of a point of detection on, for example, floors, obstacles, walls, objects, persons, animals, etc. in the surrounding.

By way of illustration, body 352, which can represent a moving body or a stationary body, can be at least in part within field of view 350 of sensor unit 104. Body 352 can have a surface 354 positioned proximally to sensor unit 104 such that sensor unit 104 detects at least surface 354. As the LIDAR of sensor unit 104 detects light reflected from surface 354, sensor unit 104 can detect the position of surface 354, which can be indicative at least in part of the location of body 352. Where the LIDAR is a planar LIDAR, the point cloud can be on a plane. In some cases, each point of the point cloud has an associated approximate distance from the LIDAR. Where the LIDAR is not planar, such as a 3D LIDAR, the point cloud can be across a 3D area.

Figure 4:
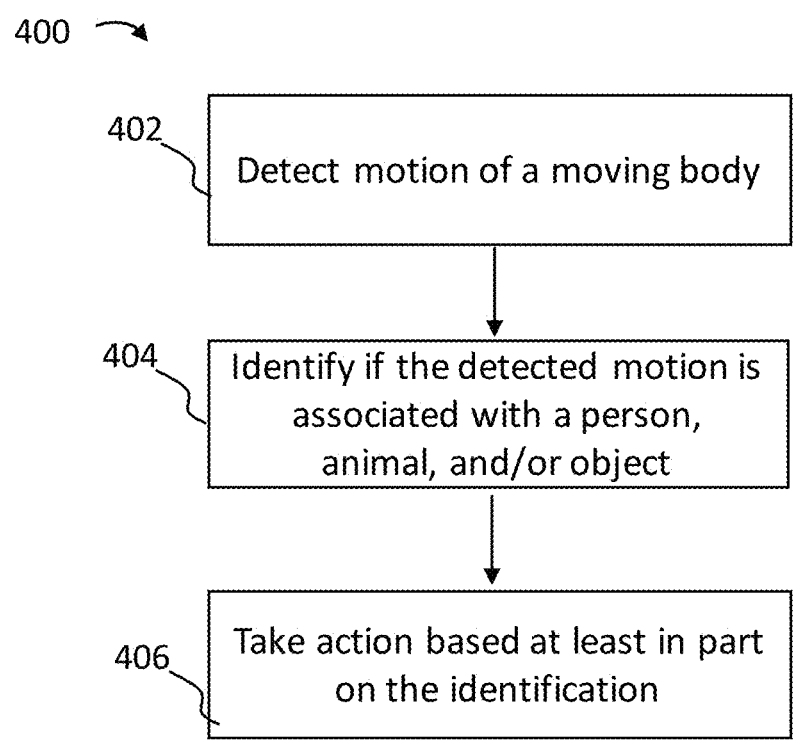
FIG. 4 is a process flow diagram of an exemplary method in which a robot can identify moving bodies, such as people, animals, and/or objects, in accordance with some implementations of the present disclosure.

FIG. 4 is a process flow diagram of an exemplary method 400 in which a robot 100 can identify moving bodies, such as people, animals, and/or objects, in accordance with some implementations of the present disclosure.

Portion 402 includes detecting motion of a moving body. By way of illustration, motion can be detected by one or more sensor units 104A-104N. In some implementations, one or more sensor units 104A-104N can detect motion based at least in part on a motion detector, such as the motion detectors described with reference to FIG. 3A as well as elsewhere throughout this disclosure. In some implementations, one or more of sensor units 104A-104N can detect motion based at least in part on a difference signal, wherein robot 100 (e.g., using controller 304) determines the difference signal based at least in part on a difference (e.g., using subtraction) between data collected by one or more sensor units 104A-104N at a first time from data collected by the same one or more sensor units 104A-104N at a second time. The difference signal can reflect, at least in part, whether objects have moved because the positional measurements of those objects will change if there is movement between the times in which the one or more sensor units 104A-104N collect data.

In some cases, robot 100 may itself be stationary or moving. For example, robot 100 may be travelling in a forward, backward, right, left, up, down, or any other direction and/or combination of directions. As robot 100 travels, it can have an associated velocity, acceleration, and/or any other measurement of movement. Accordingly, in some cases, the difference signal based at least in part on sensor data from sensor units 104A-104N taken at a first time and a second time may be indicative at least in part of motion because robot 100 is actually moving, even when surrounding objects are stationary. Robot 100 can take into account its own movement by accounting for those movements (e.g., velocity, acceleration, etc.) in how objects are expected to appear. For example, robot 100 can compensate for its own movements in detecting movement based on at least difference signals. As such, robot 100 can consider at least a portion of difference signals based at least in part on sensor data from sensor units 104A-104N to be caused by movement of robot 100. In many cases, robot 100 can determine its own speed, acceleration, etc. using odometry, such as speedometers, accelerometers, gyroscopes, etc.

For additional robustness, in some implementations, a plurality of times can be used, and differences can be taken between one or more of them, such as data taken between a first time, second time, third time, fourth time, fifth time, and/or any other time. In some cases, the data taken at a time can also be described as data taken in a frame because digital sensors can collect data in discrete frames. As used herein, time can include a time value, time interval, period of time, instance of time, etc. Time can be measured in standard units (e.g., time of day) and/or relative times (e.g., number of seconds, minutes, hours, etc. between times).

As an illustrative example, sensor unit 104 can collect data (e.g., sensor data) at a first time and a second time. This data can be a sensor measurement, image, and/or any other form of data generated by sensor unit 104. For example, the data can include data generated by one or more LIDARs, radars, lasers, video cameras, infrared cameras, 3D sensors, 3D cameras, and/or any other sensors known in the art, such as those described with reference to FIG. 3A as well as elsewhere throughout this disclosure. The data collected at the first time can include at least a portion of data indicative at least in part of a person, animal, and/or object. In some implementations, the data indicative at least in part of the person, animal, and/or object can also be associated at least in part with a first position in space. The position can include distance measurements, such as absolute distance measurements using standard units, such as inches, feet, meters, or any other unit of measurement (e.g., measurements in the metric, US, or other system of measurement) or distance measurements having relative and/or non-absolute units, such as ticks, pixels, percentage of range of a sensor, and the like. In some implementations, the position can be represented as coordinates, such as (x, y) and/or (x, y, z). These coordinates can be global coordinates relative to a predetermined, stationary location (e.g., a starting location and/or any location identified as the origin). In some implementations, these coordinates can be relative to a moving location, such as relative to robot 100.

In some cases, the data collected at the second time may not include the portion of data indicative at least in part of the person, animal, and/or object. Because the data indicative at least in part of the person, animal, and/or object was present in the first time but not the second time, controller 304 can detect motion in some cases. The opposite can also be indicative of motion, wherein the data collected at the second time includes a portion of data indicative at least in part of a person, animal, and/or object and the data collected at the first time does not include the portion of data indicative at least in part of the person, animal, and/or object. As previously mentioned, robot 100 can also take into account its own movement, wherein robot 100 may expect that objects will move out of the field of vision of sensor 104 due to the motion of robot 100. Accordingly, robot 100 may not detect motion where an object moves in/out of view if going in/out of view was due to the movement of robot 100.

In some cases, the data collected at the second time does includes the portion of data indicative at least in part of the person, animal, and/or object associated at least in part with a second position in space, where the second position is not substantially similar to the first position. Accordingly, robot 100 (e.g., controller 304) can detect motion based at least in part on the change between the first and second positions, wherein that change was not only due to movement by robot 100.

In some implementations, a position threshold can be used. Advantageously, the position threshold can reduce false positives because differences in detected positions of objects may be subject to noise, movement by robot 100, measurement artifacts, etc. By way of illustration, a position threshold can be set by a user, preprogrammed, and/or otherwise determined based at least in part on sensor noise, empirical determinations of false positives, velocity/acceleration of robot 100, known features of the environment, etc. The position threshold can be indicative at least in part of the amount of difference in position between the first position and the second position of a body such that robot 100 will not detect motion. In some implementations, the position threshold can be a percentage (e.g., percentage difference between positions) or a value, such as absolute and/or relative distance measurements. If a measure of the positional change of a body, such as a person, animal, and/or object, between times (e.g., between the first position and the second position) is greater than and/or equal to the position threshold, then robot 100 can detect motion.

Similarly, data collected at different times can also be compared, such as comparing data collected between each of the plurality of the aforementioned times, such as a first time, second time, third time, fourth time, fifth time, and/or any other time. At such times, robot 100 can sense a first position, second position, third position, fourth position, fifth position, and/or any other position in a substantially similar way as described with reference herein to the first position and the second position. Advantageously, comparing data at a plurality of times can increase robustness by providing additional sets of data in which to compare to detect motion of a moving body. For example, certain movements of positions may be small between times, falling below the position threshold. By way of illustration, the difference between the second position and the first position may be within the position threshold, thereby within the tolerance of the robot not to detect motion. However, using a plurality of times can allow robot 100 to compare across multiple instances of time, further enhancing the ability to detect motion. By way of illustration, the first time, second, time, third time, fourth time, fifth time, etc. can be periodic (e.g., substantially evenly spaced) or taken with variable time differences between one or more of them. In some implementations, certain times can be at sub-second time differences from one or more of each other. In some implementations, the times can be at an over a second difference from one or more of each other. By way of illustration, the first time can be at 200 ms, the second time at 0.5 seconds, and the third time at 1 second. However, other times can also be used, wherein the times can be determined based at least on the resolution of one or more of sensor units 104A-104N, noise (e.g., of the environment or of one or more of sensor units 104A-104N), tolerance to false positives, and/or machine learning.

For example, walls can be more susceptible to false positives because walls are large objects, which can provide more area for noise. In some cases, false detections can be due to the movement of robot 100, which can cause the stationary walls to appear as if they are moving. Also, around stationary objects, there can be motion artifacts that are created by sensor noise. Other examples include stationary objects within field of view 306.

In some implementations, robot 100 can have a map of the environment in which it is operating (e.g., navigating in some implementations). For example, robot 100 can obtain the map through user upload, download from a server, and/or generating the map based at least in part on data from one or more of sensor units 104A-104N and/or other sensors. The map can include indications of the location of objects in the environment, including walls, boxes, shelves, and/or other features of the environment. Accordingly, as robot 100 operates in the environment, robot 100 can utilize a map to determine the location of objects in the environment, and therefore, dismiss detections of motion of at least some of those objects in the environment in the map as noise. In some cases, robot 100 can also determine that bodies it detects substantially close to (e.g., within a predetermined distance threshold) stationary objects in maps are also not moving bodies. Advantageously, noise may be higher around stationary objects. By ignoring motion substantially close to those stationary objects, robot 100 can cut down on false positives. For example, a predetermined distance threshold can be 0.5, 1, 2, 3, or more feet. If motion is detected within the predetermined distance threshold from the moving bodies, the motion can be ignored. This predetermined distance threshold can be determined based at least in part on empirical data on false positives and/or false negatives, the velocity/acceleration in which robot 100 travels, the quality of map, sensor resolution, sensor noise, etc.

In some implementations, where robot 100 is moving, determination of the difference signal can also take into account the movement of the robot. For example, robot 100 can compare a difference signal associated with at least the portion of data associated with the moving body with difference signals associated with other portions of the data from the same times (e.g., comparing a subset of a data set with other subsets of the data set at the same times). Because the moving body may have disproportionate movement relative to the rest of the data taken by robot 100 in the same time period, robot 100 can detect motion of the moving body. In some implementations, robot 100 can detect motion when the difference between the difference signal associated with at least the portion of data associated with a moving body and the difference signals associated with other data from the same times is greater than or equal to a predetermined threshold, such as a predetermined difference threshold. Accordingly, robot 100 can have at least some tolerance for differences wherein robot 100 does not detect motion. For example, differences can be due to noise, which can be produced due to motion artifacts, noise, resolution, etc. The predetermined difference threshold can be determined based at least on the resolution of one or more of sensor units 104A-104N, noise (e.g., of the environment or of one or more of sensor units 104A-104N), tolerance to false positives, and/or machine learning.

In some implementations, robot 100 can project the motion of robot 100 and/or predict how stationary bodies will appear between one time and another. For example, robot 100 can predict (e.g., calculating based at least upon trigonometry), the change in the size of a stationary body as robot 100 moves closer, further away, or at an angle to that stationary body and/or the position of the stationary bodies as robot 100 moves relative to them. In some implementations, robot 100 can detect motion when the difference between the expected size of a body and the sensed size of the body is greater than or equal to a predetermined threshold, such as a predetermined size difference threshold. Accordingly, robot 100 can have some tolerance for differences wherein robot 100 does not detect motion. For example, differences between actual and predicted sizes can be a result noise generated due to motion artifacts, noise, resolution, etc. The predetermined size threshold can be determined based at least on the resolution of one or more of sensor units 104A-104N, noise (e.g., of the environment or of one or more of sensor units 104A-104N), tolerance to false positives, and/or machine learning.

In some implementations, robot 100 can further utilize machine learning, wherein robot 100 can learn to detect instances of motion by seeing instances motion. For example, a user can give robot 100 feedback based on an identification of motion by robot 100. In this way, based on at least the feedback, robot 100 can learn to associate characteristics of motion of moving bodies with an identification of motion. Advantageously, machine learning can allow robot 100 to adapt to more instances of motion of moving bodies, which robot 100 can learn while operating.

Portion 404 can include identifying if the detected motion is associated with a person, animal, and/or object. For example, robot 100 can process the data from one or more of sensor units 104A-104N to determine one or more of the size, shape, and/or other distinctive features. When detecting a person and/or animal, such distinctive features can include feet, arms, column-like shapes, etc.

By way of illustration of detection of column-like shapes, FIG. 5A is a functional block diagram illustrating an elevated side view of sensor units 104A-104B detecting moving body 500 in accordance with some implementations of this disclosure. Column-like shapes include shapes that are vertically elongated and at least partially continuous (e.g., connected). In some cases, the column-like shape can be entirely continuous. In some cases, the column-like shape can be substantially tubular and/or oval. Sensor unit 104A can include a planar LIDAR angled at angle 520, which can be the angle relative to a horizontal plane, or an angle relative to any other reference angle. Angle 520 can be the angle of sensor unit 104A as manufactured, or angle 520 can be adjusted by a user. In some cases, angle 520 can be determined based at least in part on the desired horizontal range of the LIDAR (e.g., how far in front desirable for robot 100 to measure), the expected height of stationary or moving bodies, the speed of robot 100, designs of physical mounts on robot 100, and other features of robot 100, the LIDAR, and desired measurement capabilities. By way of illustration, angle 520 can be approximately 20, 25, 30, 35, 40, 45, 50, or other degrees. Accordingly, the planar LIDAR of sensor unit 104A can sense along plane 502A (illustrated as a line from the illustrated view of FIG. 5A, but actually a plane as illustrated in FIG. 3B). Similarly, sensor unit 104B can include a planar LIDAR approximately horizontally positioned, where sensor unit 104B can sense along plane 502B (illustrated as a line from the illustrated view of FIG. 5A, but actually a plane as illustrated in FIG. 3B). As illustrated, both plane 502A and plane 502B intersect (e.g., sense) moving body 500. For example, plane 502A can intersect moving body 500 at intersect 524A. Plane 502B can intersect moving body 500 at intersect 524B. While intersects 524A-524B appear as points from the elevated side view of FIG. 5A, intersects 524A-524B are actually planar across a surface, in a substantially manner as illustrated in FIG. 3B. Moreover, although LIDAR is described for illustrative purposes, a person having ordinary skill in the art would recognize that any other sensor desirable can be used, including any described with reference to FIG. 3A as well as elsewhere throughout this disclosure.

One challenge that can occur is determining if the data acquired in intersect 524A and intersect 524B belong to an at least partially continuous body (e.g., a single body rather than a plurality of bodies). In some implementations, robot 100 can determine the position of intersect 524A and intersect 524B. In cases where intersect 524A and intersect 524B lie in approximately a plane (e.g., have substantially similar x-, y-, and/or z-coordinates), robot 100 can detect that the points may be part of an at least partially continuous body spanning between at least intersect 524A and intersect 524B. For example, intersect 524A and intersect 524B can include at least two points in substantially the same vertical plane.

In some implementations, robot 100 (e.g., controller 304) can process, compare, and/or merge the data of sensor unit 104A and sensor unit 104B to determine that moving body 500 has a vertical shape, such as a column-like body. For example, in some implementations, sensor unit 104A and sensor unit 104B can each determine distances to intersect 524A and intersect 524B, respectively. If the distance in the horizontal direction (e.g., distance from robot 100) are substantially similar between at least some points within intersect 524A and interest 524B, robot 100 can determine that intersect 524A and intersect 524B are part of a column-like body that is at least partially continuous between intersect 524A and intersect 524B. In some implementations a tolerance and/or a predetermined threshold, such as a distance threshold, to determine how much different the horizontal distances can be before robot 100 no longer determines they are substantially similar. The difference threshold can be determined based at least on resolutions of sensor units 104A-104B, noise, variations in bodies (e.g., people have arms, legs, and other body parts that might not be exactly planar), empirical data on false positives and/or false negatives, etc.

In some implementations, robot 100 can detect moving body 500 as a column-like body in a plurality of ways in the alternative or in addition to the aforementioned. For example, robot 100 can assume that if it detects an object with both sensor unit 104A and sensor unit 104B, the object is a column-like body that is at least partially continuous between intersect 524A and intersect 524B. In some cases, there may be false positives in detecting, for example, walls, floors, and/or other stationary objects. Robot 100 can ignore the detection of walls, floors, and other stationary objects by not detecting a column-like body when it encounters such walls, floors, and other stationary objects using one or more of sensor units 104A-104N, and/or robot 100 can recognize the detection of those walls, floors, and other stationary objects based at least in part on a map of the environment.

As another example, robot 100 can utilize data taken over time to determine if data acquired from intersect 524A and intersect 524B corresponds to an at least partially continuous moving body 500. For example, during different instances of time, robot 100 can be moving and/or moving body 500 can be moving. Accordingly, the intersect between sensing planes 502A-502B and a moving body 500 can result in sensor units 104A-104B collecting data from different points along the moving body 500 at different times, allowing robot 100 to merge the data and determine that moving body is at least partially continuous.

By way of illustration, FIGS. 5B-5C are functional block diagrams of the sensor units illustrated in FIG. 5A detecting person 102 in accordance with some principles of this disclosure. Person 102 can be a particular instance of moving body 500 from FIG. 5A. In FIG. 5B, sensor units 104A-104B detect person 102 at a first time. At this first time, sensor unit 104A collects data from intersect 504A and sensor unit 104B collects data from intersect 504B. In FIG. 5C, sensor units 104A-104B detect person 102 at a second time. Sensor unit 104A collects data from intersect 514A and sensor unit 104B collects data from intersect 514B. As illustrated, intersect 504A and intersect 514A can be at different positions on person 102, and intersect 504B and intersect 514B can be at different positions on person 102. Accordingly, robot 100 can acquire additional data about person 102 at different times because sensor units 104A-104B can measure different points on person 102. Robot 100 can further take additional measurements at a plurality of times, gathering data at even more points. As such, robot 100 can merge the data to determine characteristics of moving body 500, such as person 102, from the measurements taken by sensor units 104A-104B at a plurality of times.

In some implementations, robot 100 can determine characteristics of moving body 500. For example, where moving body 500 is person 102, person 102 has features that may distinguish it from other moving bodies. For example, person 102 can have arms, such as arm 530. Person 102 can have legs, such as leg 532, where the legs also can have feet. Accordingly, robot 100 can detect these features of person 102 in order to determine that moving body 500 is person 102 (or an animal or a robot with body form substantially similar to a human or animal). Or in the absence of such features, determine that moving body 500 is not a person 102 (or not an animal or a robot with body form substantially similar to a human or animal).

For example, robot 100 can detect features of person 102 from at least portions of data collected by sensor units 104A-104B. In some implementations, the portions of data collected by sensor units 104A-104B can be indicative at least in part of those features, such as arms, legs, feet, etc. In some implementations, robot 100 can detect the characteristics of these features in a time (e.g., frame) of measurements. For example, in FIG. 5B, sensor 104A can detect the shape of arm 530 (e.g., rounded and/or ovular, having a hand, extending from person 102, and/or any other characteristic) and leg 532 (e.g., rounded and/or ovular, having a foot, extending downward from person 102, and/or any other characteristic). These shapes can be determined from the sensor data. For example, an image generated from the sensor data can show the shapes and/or characteristics of person 102. Robot 100 can identify those shapes and/or characteristics using visual systems, image processing, and/or machine learning.

In some implementations, robot 100 can detect the characteristics of the features over a plurality of times (e.g., frames), such as the first time, second time, third, time, fourth time, fifth time, etc. aforementioned. For example, as previously described with reference to FIGS. 5B-5C, robot 100 can acquire additional data about person 102 at different times because sensor units 104A-104B can measure different points on person 102. Robot 100 can further take additional measurements at a plurality of times, gathering data at even more points. As such, robot 100 can merge the data to determine characteristics of moving body 500 (e.g., person 102) from the measurements taken by sensor units 104A-104B at a plurality of times. From the plurality of measurements, robot 100 can determine the characteristics, such as shapes, of features of person 102 (e.g., arms, legs, hands, feet, etc.) and determine that person 102 is a person (or an animal or a robot with body form substantially similar to a human or animal).

As another example, motion of limbs can be indicative at least in part that moving body 500 is a person 102. In some cases, person 102 may swing his/her arm(s), legs, and/or other body parts while moving. Systems and methods of detecting motion, such as those described with reference to FIGS. 5A, 5B, and 5C, as well as throughout this disclosure, can be used to detect motion associated with parts of person 102, such as arms, legs, and/or other body parts.

By way of illustration, FIG. 6 is an angled top view of sensor unit 104 detecting the swinging motion of legs 600A-600B in accordance with some implementations of the present disclosure. Legs 600A-600B can be legs of person 102 (and/or other animals, robots, etc.). In some cases, one or more of legs 600A-600B can be natural legs. In some cases, one or more of legs 600A-600B can include prosthetics and/or other components to facilitate motion of person 102. Accordingly, when person 102 walks, runs, and/or otherwise moves from one location to another, person 102 can move legs 600A-600B. In some cases, person 102 can have a gait pattern. For example, as person 102 walks forward, one of legs 600A-600B can be planted while the other of legs 600A-600B can be in a swinging motion. By way of illustration, the gait cycle can involve a stance phase, including heel strike, flat foot, mid-stance, and push-off, and a swing phase, including acceleration, mid-swing, and deceleration.

As previously described with reference to FIG. 3B and elsewhere in this disclosure, sensor unit 104 can have field of view 350. Using, for example, any of the methods aforementioned for detecting motion with reference to FIGS. 5A-5C, as well as elsewhere throughout this disclosure, sensor unit 104 can detect the motion of the swinging leg of legs 600A-600B. Also as described with reference to FIGS. 5A-5C, as well as elsewhere throughout this disclosure, sensor unit 104 can also include a LIDAR, which can be used to detect the motion. Similar swinging motions can be detected in arms and/or other portions of person 102. In some implementations, sensor unit 104 can also detect the stationary leg of legs 600A-600B. Accordingly, robot 100 can determine the presence of person 102 based at least in part on the swinging leg of legs 600A-600B and/or the stationary leg of legs 600A-600B. Advantageously, the combination of the swinging leg and stationary leg of person 102 can give a distinct pattern that sensor unit 104 can detect.

For example, based on data from sensor unit 104, controller 304 can identify moving body 500 as person 102 based at least in part on a swinging motion of at least a portion of a column-like moving body 500, such as the swinging leg of legs 600A-600B.

As another example, controller 304 can detect a swinging portion of column-like moving body 500 with a stationary portion in close proximity. By way of illustration, the swinging portion can be the swinging leg of legs 600A-600B, which can be detected by sensor unit 104 as a substantially tubular portion of moving body 500 in motion.

Robot 100 can identify those shapes and/or characteristics using visual systems, image processing, and/or machine learning. The stationary leg of legs 600A-600B can be detected by sensor unit 104 as a substantially vertical, substantially tubular portion of moving body 500. Detecting both the substantially tubular portion of moving body 500 in motion and substantially vertical, substantially tubular portion of moving body 500 can cause, at least in part, robot 100 to detect person 102. In some cases, robot 100, using controller 304, can have a leg distance threshold, wherein when the distance between at least a portion of the substantially tubular portion of moving body 500 in motion and the substantially vertical, substantially tubular portion of moving body 500 is less than or equal to the predetermined leg distance threshold, robot 100 can determine that the substantially tubular portions are legs belonging to person 102 and detect person 102. The predetermined leg distance threshold can be determined based at least in part on the size of a person, field of view 350, the resolution of the sensor data, and/or other factors. This determination can occur at using data from at least two times (e.g., based at least in part on data from sensor 104 taken at two or more times).

In some implementations, robot 100 can use data from sensor unit 104 taken at a plurality of times, in some cases more than at two times. For example, controller 304 can identify person 102 by the alternate swinging pattern of the gait. For example, while walking, running, and/or otherwise moving, person 102 can alternate which of legs 600A-600B is swinging and which of legs 600A-600B is stationary. Indeed, this alternating motion allows person 102 to move. Accordingly, controller 304 can identify, from the data from sensor unit 104, the alternating motion of the legs. By way of illustration, using aforementioned systems and methods described with reference to FIG. 6, as well as elsewhere throughout this disclosure, robot 100 can detect that leg 600A is swinging and leg 600B is stationary at a first time and/or set of times. At a second time and/or set of times, using these same systems and methods, robot 100 can detect that leg 600A is stationary and leg 600B is swinging. According, because of this alternation, robot 100 can determine that moving body 500 is person 102. For additional robustness, more alternations can be taken into account. For example, an alternation threshold can be used, wherein if robot 100 detects a predetermined number of alternating swinging states between leg 600A and leg 600B, robot 100 can determine that moving body 500 is person 102. The predetermined number of alternating swinging states can be determined based at least in part on the speed robot 100 is moving, the size of field of view 350, the tolerance to false positives, sensor sensitivity, empirically determined parameters, and/or other factors. By way of example, the predetermined number of alternating swing states can be 2, 3, 4, 5, or more alternations.

Figure 7:
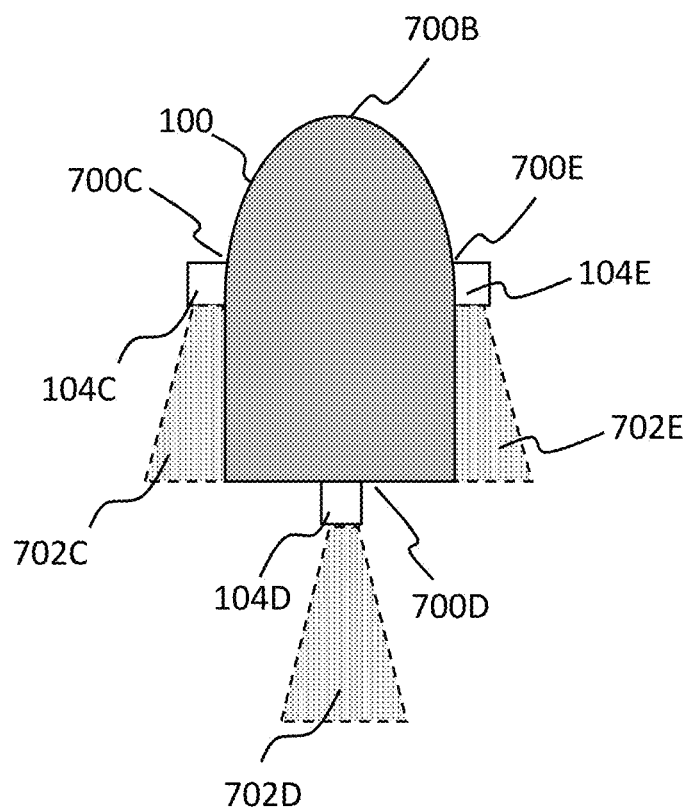
FIG. 7 is a top view of an exemplary robot having a plurality of sensor units in accordance with some implementations of the present disclosure

As another example, the location of the detection of moving body 500 relative to robot 100 can also be used by robot 100 to identify moving body 500 as person 102. For example, FIG. 7 is a top view of an example robot 100 having a plurality of sensor units 104C-104E in accordance with some implementations of this disclosure. For example, sensor unit 104C can be positioned on left side 700C of robot 100, with field of view 702C from sensor unit 104C extending in a direction at least towards back side 700D. Advantageously, field of view 702C can allow sensor unit 104C to detect moving body 500 approaching left side 700C of robot 100 because such moving body 500 can be detected within field of view 702C. Similarly, sensor unit 104E can be positioned on right side 700E of robot 100, with field of view 702E from sensor unit 104E extending in a direction at least towards back side 700D. Advantageously, field of view 702E can allow sensor unit 104E to detect moving body 500 approaching right side 700E of robot 100 because such moving body 500 can be detected within field of view 702E. Sensor unit 104D can be positioned on back side 700D of robot 100, with field of view 702D from sensor unit 104D extending a direction at least distally from back side 700D. Advantageously, field of view 702D can allow sensor unit 104D to detect moving body 500 approaching from back side 700D.

In some implementations, robot 100 can determine that moving body 500 is person 102 based at least in part of moving body 500 being detected by at least one of sensor units 104C-104E. In such a detection, in some implementations, robot 100 may be moving or stationary. For example, in some implementations, any detection in fields of view 702C, 702D, and 702E (of sensor units 104C, 104D, and 104E, respectively) can be determined by robot 100 to be from person 102. Advantageously, because of the close proximity of moving body 500 to robot 100 within one of fields of view 702C, 702D, and 702E, for at least safety reasons, robot 100 can assume moving body 500 is person 102. Moreover, where robot 100 is moving, a detection of moving body 500 at one of fields of view 702C, 702D, and 702E can be indicative at least in part of person 102 moving to catch robot 102. In addition or in the alternative, in some implementations, each of sensors 104C, 104D, and 104E can detect motion and/or identify person 102 using systems and methods substantially similar to those described in this disclosure with reference to sensor 104.

As another example, controller 304 can utilize machine learning to identify the gait motion of legs 600A-600B based at least in part on sensor data from sensor unit 104 taken at one or more times. By way of illustrative example, a library, stored on a server and/or within memory 302, can comprise example sensor data of people (or animals or robots with body form substantially similar to a human or animal), such as LIDAR data indicative of a person. Any other data of any other sensor described in this disclosure, such as with reference to FIG. 3A, can be in the library. That LIDAR data can include data relating to, at least in part, motion and/or the existence of one or more of arms, legs, and/or other features of a person. The library can then be used in a supervised or unsupervised machine learning algorithm for controller 304 to learn to identify/associate patterns in sensor data with people. The sensor data of the library can be identified (e.g., labelled by a user (e.g., hand-labelled) or automatically, such as with a computer program that is configured to generate/simulate library sensor data and/or label that data). In some implementations, the library can also include data of people (or animals or robots with body form substantially similar to a human or animal) in different lighting conditions, angles, sizes (e.g., distances), clarity (e.g., blurred, obstructed/occluded, partially off frame, etc.), colors, temperatures, surroundings, etc. From this library data, controller 304 can first be trained to identify people. Controller 304 can then use that training to identify people in data obtained in portion 402 and/or portion 404.

For example, in some implementations, controller 304 can be trained from the library to identify patterns in library data and associate those patterns with people. When data obtained in portion 402 and/or portion 404 has the patterns that controller 304 identified and associated to people, controller 304 can determine that the data obtained in portion 402 and/or portion 404 contains a person and/or the location of the person in the obtained data. In some implementations, controller 304 can process data obtained in portion 402 and portion 404 and compare that data to at least some data in the library. In some cases, where obtained data substantially matches data in the library, controller 304 can identify the obtained data as containing a person and/or the location of the person in the obtained data.

In some implementations, people can be identified from the sensor data based at least on size and/or shape information wherein, the size and/or shape of the moving object, as represented in the sensor data, has the appearance of a person.

In some cases, additional robustness can be built into the detection. Such robustness can be useful, for example, due to noise and/or aberrations in sensor units 104A-104B, false detections can occur. By way of illustration, one or both of sensor units 104A-104B can make a detection that is not there. By way of another illustration, an object can quickly move out of the field of view of sensor units 104A-104B. Based at least on the false detection, robot 100 can incorrectly identify the presence of a person 102 and behave accordingly. In such situations, in some implementations, robot 100 can clear data associated with one or more sensor units 104A-104B at the time the false detection occurred, such as clearing data collected at a time in a manner described with reference to FIGS. 5A-5C, as well as elsewhere throughout this disclosure. This ability can allow robot 100 to avoid making a false detection. In some cases, one of sensor units 104A-104B can be used clear detections.

In some implementations, upon detecting at least a portion of moving body 500 at a time, robot 100 can predict a movement of moving body. For example, robot 100 can determine the acceleration, position, and/or velocity of moving body 500 at a time or plurality of times. Based at least in part on that acceleration, position, and/or velocity, robot 100 can predict where moving body 500 will be. In some implementations, the prediction can be based on predetermined associations between acceleration, position, and/or velocity and movement of moving body 500. In some cases, the associations can be determined empirically, based on general physical properties, etc. For example, if moving body 500 is moving to the right at a first time, robot 100 can predict that a subsequent time, moving body 500 will be right of the position moving body 500 was at the first time. Based on the velocity and/or acceleration of moving body 500, and the amount of time that has lapsed, robot 100 can predict how much moving body 500 moves.

In some cases, robot 100 can determine a probability to various positions. Advantageously, assigning probabilities to various positions can account for changes in movements of moving body 500. For example, where moving body 500 is person 102, person 102 can change directions, suddenly stop, etc. Accordingly, robot 100 can assign probabilities associated with different positions moving body 500 can be in. In some cases, such probabilities can be determined using Bayesian statistical models based at least in part on empirically determined movements, general physical properties, etc. In some cases, the probabilities can be represented in a volume image, wherein positions in space (e.g., in a 2D image or in a 3D image) can be associated with a probability. In some cases, there can be positions with high probabilities, wherein the probabilities form a probabilistic tail, tailing off at less likely positions.

Where moving body 500 moves to a position with high probability as determined by robot 100, robot 100 can determine that it has not made a false detection (and/or not determine that it has made a false detection). Where moving body 500 has detected a position with a low probability, robot 100 may collect more data (e.g., take more measurements at different times and/or consider more data already taken) and/or determine that robot 100 has made a false detection.

Returning to FIG. 4, portion 406 can include taking action based at least in part on the identification from portion 404. For example, in response to detecting a person 102 in portion 404, robot 100 can slow down, stop, and/or modify plans accordingly.

Figures 8A, 8B:
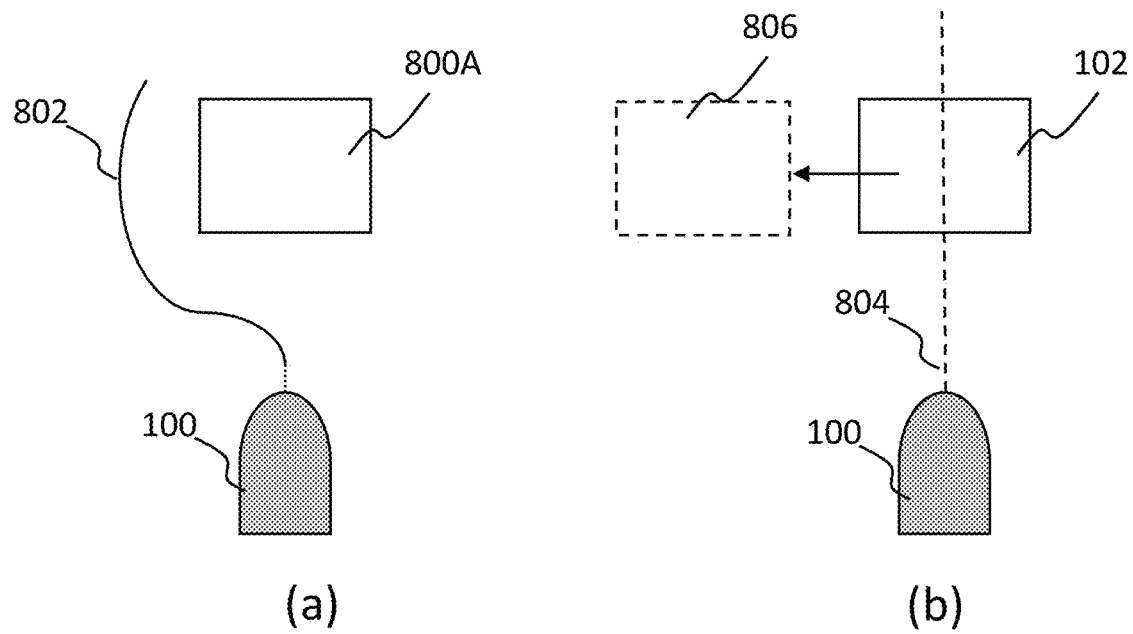
FIG. 8A is an overhead view of a functional diagram of a path an exemplary robot can use to navigate around an object in accordance with some implementations of the present disclosure.
FIG. 8B is an overhead view of a functional diagram of a path an exemplary robot can use to navigate around a person in accordance with some implementations of the present disclosure.

By way of illustrative example, FIG. 8A is an overhead view of a functional diagram of a path robot 100 can use to navigate around an object 800A in accordance with some implementations of the present disclosure. Robot 100 can go in a path 802 around object 800A in order to avoid running into object 800A. However, challenges can occur when object 800A is moving. For example, the movement of object 800A could cause robot 100 to navigate further from the unaltered path of robot 100 and/or cause robot 100 to run into object 800A.

FIG. 8B is an overhead view of a functional diagram of a path robot 100 can use to navigate around person 102 in accordance with some implementations of the present disclosure. Person 102 can move to position 806. If robot 100 identified moving body 500 as person 102 in portion 404, robot 100 can perform an action based at least in part on that determination. For example, robot 100 can slow down and/or stop along path 804 and allow person 102 to pass. In some implementations, path 804 can be the path that robot 100 was traveling in the absence of the presence of person 102.

For example, in some implementations, robot 100 can slow down sufficiently so that robot 100 approaches person 102 at a speed that allows person 102 to pass. Once robot 100 has passed person 102, it can speed up. As another example, robot 100 can come to a complete stop and wait for person 102 to pass. Advantageously, allowing person 102 to pass can allow robot 100 to avoid running into person 102, avoid deviating from the path robot 100 was travelling, and/or give person 102 a sense that robot 100 has detected him/her.

In some implementations, robot 100 can monitor the motion of person 102. Once person 102 has moved out of the fields of view of sensor units 104A-104N, robot 100 can speed up and/or resume from a stopped position along path 804. In some implementations, robot 100 can wait a predetermined time before attempting to continue on path 804. The predetermined time can be determined based at least in part upon the speed of robot 100 (e.g., slowed down, stopped, or otherwise), the speed of person 102, the acceleration of robot 100, empirical data on times it takes for person 102 to pass, and/or any other information. After the predetermined time, robot 100 can attempt to pass again. In some cases, path 804, or a substantially similar path, can be clear. In some cases, robot 100 may wait again after the predetermined time if path 804 is still blocked. In some cases, if path 804 is still blocked after the predetermined time, robot 100 can swerve around the object (e.g., in a manner similar to path 802 as illustrated in FIG. 8A).

In some implementations, where person 102 approaches from the back or side, as described with reference to FIG. 7 as well as elsewhere throughout this disclosure, robot 100 can slow down and/or stop.

Figure 9:
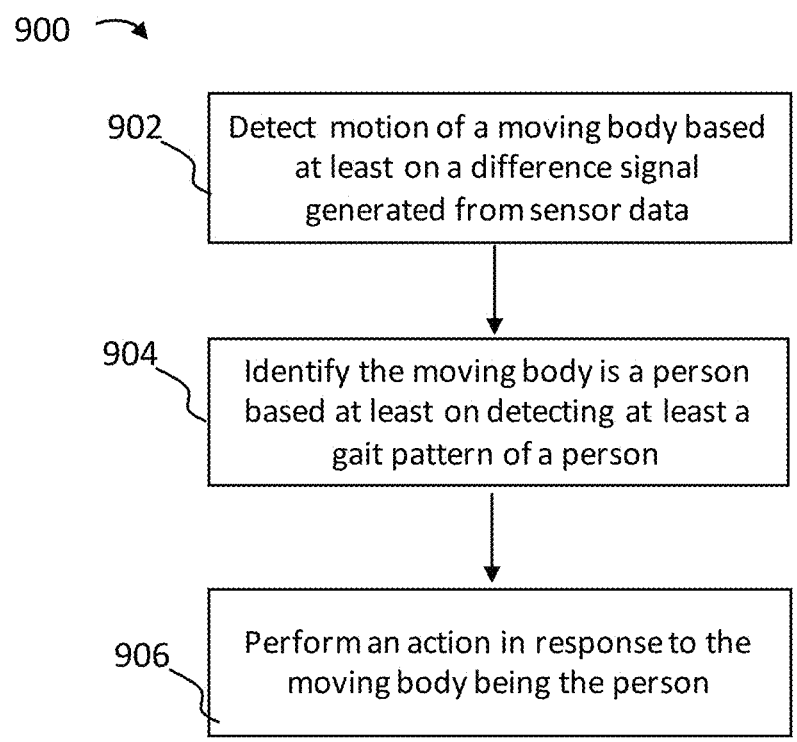
FIG. 9 is a process flow diagram of an exemplary method for detecting and responding to a person in accordance with some implementations of the present disclosure All Figures disclosed herein are © Copyright 2018 Brain Corporation. All rights reserved.

FIG. 9 is a process flow diagram of an exemplary method 900 for detecting and responding to person 102 in accordance with some implementations of this disclosure. Portion 902 includes detecting motion of a moving body based at least on a difference signal generated from sensor data.

Portion 904 includes identifying the moving body is a person based at least on detecting at least a gait pattern of a person. Portion 906 includes performing an action in response to the moving body being the person.

As used herein, computer and/or computing device can include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

As used herein, computer program and/or software can include any sequence or human or machine cognizable steps which perform a function. Such computer program and/or software may be rendered in any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., BREW), and the like.

As used herein, connection, link, transmission channel, delay line, and/or wireless can include a causal link between any two or more entities (whether physical or logical/virtual), which enables information exchange between the entities.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation;" adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value. Also, as used herein "defined" or "determined" can include "predefined" or "predetermined" and/or otherwise determined values, conditions, thresholds, measurements, and the like.

What is claimed is:

1. A system for detecting motion of a moving body, comprising:
    at least one processor coupled to a non-transitory memory and at least one sensor, the non-transitory memory comprising computer readable instructions stored thereon, the at least one processor configured to execute the computer readable instructions to,
    measure, using a first sensor of the at least one sensor, a distance from the first sensor to a moving body along a horizontal plane, the moving body comprises first and second objects, wherein each of the first and second objects are represented by substantially tubular portions on the horizontal plane, and the first and second objects are separated by less than or equal to a threshold distance;

detect a gait pattern of the moving body based on the first object being in motion and the second object being stationary along the horizontal plane at a first instance in time, and when the second object is in motion and the first object is stationary along the horizontal plane at a different second instance in time;

determine the moving body corresponds to a human upon detecting the gait pattern of the substantially tubular portions of each of the first and second objects; and transmit a signal to at least one actuator on a robotic device upon determining the moving body corresponds to the human, the signal corresponding to the robotic device performing an action;

wherein, the first sensor comprises a light detection and ranging sensor ("LiDAR").

2. The system of claim 1, wherein the at least one processor is further configured to execute the computer readable instructions to, determine a first intersection point on the moving body by the first sensor and a second intersection point on the moving body by a second sensor, and determine the first intersection point and second intersection point both correspond to a continuous body based on horizontal distance from the robotic device to the first intersection point and horizontal distance from the robotic device to the second intersection point are similar.

3. The system of claim 2, wherein the second sensor is separated apart from the first sensor, the second sensor comprises a planar LIDAR positioned at an angle with respect to the horizontal plane of the first sensor.

4. The system of claim 1, wherein the at least one processor is further configured to execute the computer readable instructions to, distinguish the moving body from stationary objects at least in part on a map of the environment, the stationary objects corresponds to walls, floors and other stationary objects in a field of view of the robotic device.

5. The system of claim 1, wherein the action includes at least one of the robotic device stopping, slowing down, or adjusting its trajectory.

6. A method for detecting motion of a moving body, comprising:

measuring, using a first sensor of the at least one sensor, a distance from the first sensor to a moving body along a horizontal plane, the moving body comprises first and second objects, wherein each of the first and second objects are represented by substantially tubular portions on the horizontal plane, and the first and second objects are separated by less than or equal to a threshold distance;

detecting a gait pattern of the moving body based on the first object being in motion and the second object being stationary along the horizontal plane at a first instance in time, and when the second object is in motion and the first object is stationary along the horizontal plane at a different second instance in time;

determining the moving body corresponds to a human upon detecting the gait pattern of the substantially tubular portions of each of the first and second objects; and transmitting a signal to at least one actuator on a robotic device upon determining the moving body corresponds to the human, the signal corresponding to the robotic device performing an action;

wherein, the first sensor includes a light detection and ranging sensor ("LiDAR").

7. The method of claim 6, further comprising:

determining a first intersection point on the moving body by the first sensor and a second intersection point on the moving body by a second sensor, and determining the first intersection point and second intersection point both correspond to a continuous body based on horizontal distance from the robotic device to the first intersection point and horizontal distance from the robotic device to the second intersection point are similar.

8. The method of claim 6, further comprising:

distinguishing the moving body from stationary objects at least in part on a map of the environment, the stationary objects corresponds to walls, floors and other stationary objects in a field of view of the robotic device.

9. The method of claim 6, further comprising:

determining the moving body corresponds to a column shape body based on receiving data simultaneously from both the first sensor and a second sensor.

10. A non-transitory computer readable medium having computer readable instructions stored thereon, that when executed by at least one processor configure the at least one processor to, measure, using a first sensor of the at least one sensor, a distance from the first sensor to a moving body along a horizontal plane, the moving body comprises first and second objects, wherein each of the first and second objects are represented by substantially tubular points on the horizontal plane, and the first and second objects are separated by less than or equal to a threshold distance;

detect a gait pattern of the moving body based on the first object being in motion and the second object being stationary along the horizontal plane at a first instance in time, and when the second object is in motion and the first object is stationary along the horizontal plane at a different second instance in time;

determine the moving body corresponds to a human upon detecting the gait pattern of the substantially tubular portions of each of the first and second objects; and transmit a signal to at least one actuator on a robotic device upon determining the moving body corresponds to the human, the signal corresponding to the robotic device performing an action;

wherein, the first sensor includes a light detection and ranging sensor ("LiDAR").

11. The non-transitory computer readable medium of claim 10, wherein the instructions further configure the at least one processor to:

determine a first intersection point on the moving body by the first sensor and a second intersection point on the moving body by a second sensor, and determine the first intersection point and second intersection point both correspond to a continuous body based on horizontal distance from the robotic device to the first intersection point and horizontal distance from the robotic device to the second intersection point are similar.

12. The non-transitory computer readable medium of claim 10, wherein the instructions further configure the at least one processor to:

distinguish the moving body from stationary objects at least in part on a map of the environment, the stationary objects corresponds to walls, floors and other stationary objects in a field of view of the robotic device.

13. The non-transitory computer readable medium of claim 10, wherein the instructions further configure the at least one processor to:
    determine the moving body corresponds to a column shape body based on receiving data simultaneously from both the first sensor and a second sensor.

* * * * *